United States Patent [19]

Eriksson et al.

[11] Patent Number: 5,390,067

[45] Date of Patent: Feb. 14, 1995

[54] PHASE SELECTION FOR GROUND FAULT

[75] Inventors: Leif Eriksson, Sala; Murari M. Saha; Kjell Svensson, both of Västerås, all of Sweden

[73] Assignee: ASEA Brown Boveri AB, Vasteras, Sweden

[21] Appl. No.: 21,074

[22] Filed: Feb. 23, 1993

[30] Foreign Application Priority Data

Mar. 20, 1992 [SE] Sweden ............................ 9200874

[51] Int. Cl.$^6$ .......................... H02H 3/26; H02H 3/40
[52] U.S. Cl. ......................................... 361/79; 361/76; 361/65; 361/85; 324/86; 324/108
[58] Field of Search .............................. 361/42, 44–50, 361/54–57, 60–66, 76, 77–82, 84, 85, 187, 188; 324/83 Q, 86, 107, 108

[56] References Cited

U.S. PATENT DOCUMENTS 4,148,087  4/1979  Phadke .................. 361/80

OTHER PUBLICATIONS

ASEA Relay Division; #RK556–300E; Nov. 1974; pp. 1–7.
ASEA Relay Division; #RK556–301E; Feb. 1979; pp. 1, 3, 5 & 7.
Ungrad et al.; Schutztechnik in Elektroenergiessystemen; p. 117. Jan. 1991.
GE Appl'n Guide, 1977; Sections 4–4.2.
BB Review 2–81; Progress in the Protection of Series–Compensated Lines and in the Determination of Very High Earth Fault Resistances; Baden; p. 102 and Appendix.
IEEE Proc., vol. 129, Pt. C, No. 3, May '82; Degenes; Micro–Processor–Implemented Digital Filters for the Calculation of Symmetrical Components; pp. 111–118.

Primary Examiner—A. D. Pellinen
Assistant Examiner—Ronald W. Leja
Attorney, Agent, or Firm—Watson, Cole, Grindle & Watson

[57] ABSTRACT

A method and a device for phase selection for single-pole tripping of high-impedance ground faults in direct grounded power networks. Starting from the ratio of the negative-sequence voltage to the zero-sequence current (U2/I0) and the ratio of the negative-sequence voltage to the positive-sequence voltage (U2/U1), two criteria with different conditions are formed, each of which indicating a faulted phase, and if both criteria indicate the same phase as faulted, single-pole tripping can take place.

5 Claims, 1 Drawing Sheet

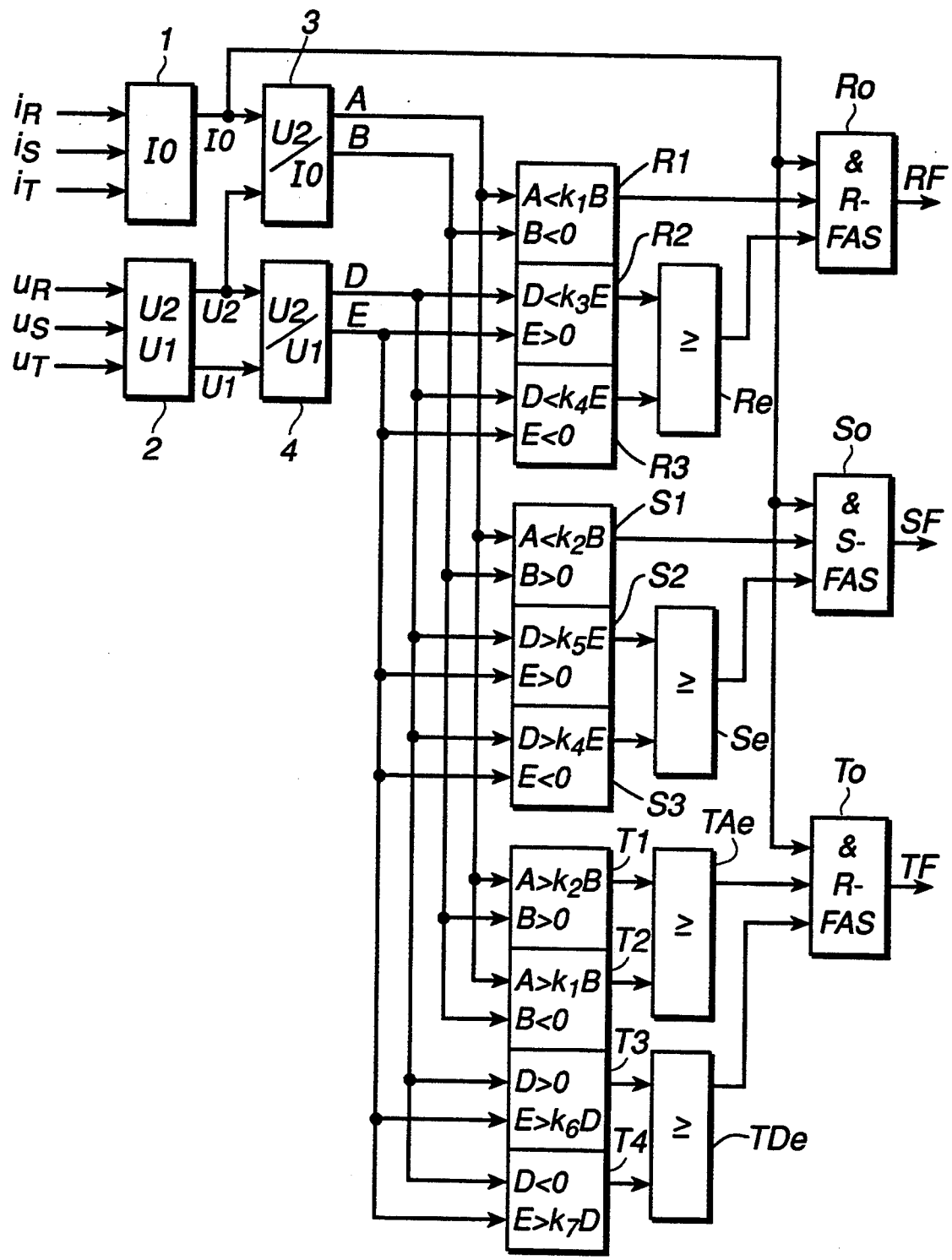

PHASE SELECTION FOR GROUND FAULT

TECHNICAL FIELD

It is both desirable and important, in the event of a fault in a power network, not to overreact by disconnecting all the phases when, for example, there is a fault in one of the phases only. The great problem in this connection, at least for faults with a high fault resistance, is to be able to determine which phase, or which phases, has (have) faulted. The present invention relates to a method and a device for phase selection for single-pole tripping of high-impedance ground faults in direct grounded power networks.

BACKGROUND ART, THE PROBLEMS

Determining which phase has faulted, or which phases have faulted, will hereafter, in accordance with the terminology used within this technical field, be referred to as "phase selection".

A number of different fault types occur in a power network, for which it is desired to learn as quickly as possible in which phase or phases a fault has occurred. The reason for this is that a faulted phase/faulted phases is/are to be disconnected from the supply sources to prevent dangerous situations from arising.

In relatively simple networks and in relatively simple contexts a phase selection can be made, in the event of a fault, by determining by means of phase-current measuring members that a phase current exceeds a pre-set value.

An obvious and simple method, in principle, is to use, as phase selection determining criterion, phase current changes exceeding a certain value related to nominal phase currents. In U.S. Pat. No. 3,956,671, such a method is described which is otherwise based on directional wave detectors for each phase and which comprises a phase selector for single-phase tripping of circuit breakers for a faulted phase and for three-phase tripping of the circuit breakers of all the phases when faults occur on two or three phases.

In another method for phase selection, the voltage reduction of the phases involved, which a fault generally results in, is also utilized in addition to the phase currents. In principle, this comprises using a voltage-dependent overcurrent relay or, as it is called within this technical field, an underimpedance relay. Such relays are described in a number of variants, for example as in ASEA Information RK 556-300 E, November 1974, "Impedance Relay Type RXZF 2" and RK 556-301 E, February 1979, "Three phase impedance relay type RXZK". These relays are activated when an impedance, calculated with measured voltages and currents, lies within an operating range, specific to the relay and defined in an R–X diagram. The methodology in this connection is somewhat different depending on whether the fault is a single-phase or a two-phase fault. Phase selection characteristics of a 3-phase power network, with the aid of underimpedance protection, is also clear from "Schutztechnik in Elektroenergiesystemen" by H. Ungrad, W. Winkler and A. Wiszniewski, Springer-Verlag, published 1991, page 117 and FIG. 6.22.

U.S. Pat. No. 4,864,453 describes a method for selective phase selection in case of faults in distribution systems with double transmission lines between two stations. The method is based on Fourier parameter estimation of phase currents and phase voltages. With the aid of these as well as the residuals of the signals, it is first determined whether an abrupt event has taken place, after which it can be determined, via logical decisions, whether a fault has occurred between the stations as well as which phase or phases has or have faulted.

When a fault occurs in a power network, this normally results in the network becoming unsymmetrically loaded. Methods for phase selection determination, based on the use of symmetrical components, have therefore often been employed. It is clear, inter alia from GE Application and Setting Guide, 1977, section 4, that the ratio of negative-sequence current I2 to zero-sequence current I0 for both single-pole and three-pole phase selectors is utilized. For single-pole phase selectors the phase position for the symmetrical currents in each phase is compared, and a time-limit is imposed on the comparison means to allow an output signal for a coincidence period corresponding to $+/-60°$. The disadvantage of using single-pole phase selectors according to this principle is that in the case of two-phase ground faults this method tends to select the faultless phase as the faulted phase. It is therefore necessary to have a three-pole phase selector which covers every conceivable multi-phase fault. The same GE publication also describes a three-pole phase selector which uses the same tripping principle as the single-phase one but where also an additional number of criteria are stated.

In an article entitled "Progress in the Protection of Series-Compensated Lines and in the Determination of Very High Earth-Fault Resistances" in Brown Boveri Rev., 2-81, pages 102/103, a phase selector is also described. The starting point for selecting the correct phase are the zero-sequence current I0 and the negative-sequence voltage U2 for the phase on which a ground fault has occurred. Since the phase position for this voltage is approximately equal to the phase position of the zero-sequence voltage U0 function is obtained in the same way as with directional ground fault relays. By using, in addition, ground fault directional relays which are based on the zero-sequence components, it is possible to determine whether a fault is a ground fault or a fault between the phases. If it is a question of a two-phase ground fault, the start relays of the distance relays are activated, and with the aid of a logic circuit the faultless phase is prevented from being selected.

In EP-B-0 276 181 a phase selection method is described which is based on different linear connections between the above-mentioned symmetrical components. The device comprises, inter alia, six filters and three phase comparators.

As will become apparent from the following description of the invention, the present invention will also be based on symmetrical components. Contrary to the processes mentioned above, where symmetrical components obtained with the aid of conventional RLC filters have been used, a discrete-time numerical technique will, however, be used for the determination. Such a method is described in "Microprocessor-implemented digital filters for the calculation of symmetrical components" by A. J. Degens in IEE PROC., Vol. 129, Pt. C, No. 3, May 1982, pages 111–118. It is clear from this publication how the symmetrical components can be described as a phase-rotating operator, that is, with a certain amplitude and phase angle or as a complex quantity with real and imaginary parts.

SUMMARY OF THE INVENTION

As will have been clear from the introductory part, the present invention relates to a method and a device for phase selection for single-pole tripping of high-impedance ground faults in direct grounded power networks. The phase currents and phase voltages of the power network are processed in a real time system with sampled measured values and with the use of discrete-time filters. The invention is based on the use of the symmetrical components U1, U2, I0, that is, the positive-sequence and negative-sequence voltages and the zero-sequence current which arise in a direct grounded power network when a fault occurs. The positive-sequence component U1 is calculated with the aid of a positive-sequence filter and orthogonal weighting functions according to the calculating technique mentioned, and the result is a continuously updated complex number. The corresponding calculating technique is used for obtaining, via a negative-sequence filter, a continuously updated complex number corresponding to the negative-sequence voltage U2.

The invention is based on the ratio U2/I0 and an additional determination is introduced by also utilizing the ratio U2/U1. The methods for evaluating these ratios and the formation of conditions for phase selection differ considerably from the prior art.

The inventive concept comprises forming from the ratio U2/I0 a first complex quantity $$U2/I0 = A + jB$$

and forming from the ratio U2/U1 a second complex quantity $$U2/U1 = D + jE$$

The conditions for phase selection according to the invention are now based on the evaluation of different combinations of A, B, D and E starting from a first complex plane for the real part A and the imaginary part B and a second complex plane for the real part D and the imaginary part E, respectively. The phase selection method means that, after a fault condition has arisen, according to the first criterion stated below a faulty phase is indicated with the aid of the first complex quantity and that thereafter, according to the second criterion stated below, the same phase is indicated as faulty with the aid of the second complex quantity such that sufficient proof is obtained that the indicated phase is the faulty one.

The first criterion consists of the following conditions which indicate the R-phase as faulty if $A < k_1 B$ and $B < 0$ and indicate the S-phase as faulty if $A < k_2 B$ and $B > 0$ and indicate the T-phase as faulty if $A > k_2 B$ and $B > 0$ or if $A > k_1 B$ and $B < 0$ where $k_1 = -\tan 30°$ and $k_2 = \tan 30°$.

The second criterion consists of the following conditions which indicate the R-phase as faulty if $D < k_3 E$ and $E > 0$ or if $D < k_4 E$ and $E < 0$ and indicate the S-phase as faulty if $D > k_5 E$ and $E > 0$ or if $D > k_4 E$ and $E < 0$ and indicate the T-phase as faulty if $D > 0$ and $E > k_6 D$ or if $D < 0$ and $E > k_7 D$ $k_3 = -\tan 70°$, $k_4 = -\tan 10°$, $k_5 = \tan 50°$, $k_6 = \tan 40°$, $k_7 = -\tan 20°$ After these two criteria and conditions have indicated a fault in the same phase, a single-pole tripping of this phase can take place. If the ground fault is not a single-phase fault, three-phase tripping is used.

DESCRIPTION OF THE PREFERRED EMBODIMENTS

A device for carrying out the described method for phase selection in case of a ground fault in a direct grounded power network can be designed in many different ways, for example in the form of individual separate filters, selectors, etc., designed for digital processing in discrete-time and numerical form, or in a microprocessor-integrated form. In both cases, the functional units needed for filtering, selector functions and tripping logic, etc., can be distinguished. The accompanying FIGURE therefore describes an embodiment which is mainly built up as functional, separate units.

The conversion of analog measured phase currents and phase voltages with the aid of current and voltage instrument transformers to filtered sampled discrete-time values $i_R$, $i_S$, $i_T$ and $u_R$, $u_S$, $U_T$, respectively, is in this context to be regarded as conventional technique and has therefore been omitted.

The above-mentioned converted current values are now supplied to an I0 device 1 for continuously obtaining a complex value of the zero-sequence current and the above-mentioned converted voltage values are supplied to a U1, U2 device 2 for continuously obtaining complex values of the positive-sequence and negative-sequence voltages. In a first quotient generator 3 the quotient U2/I0 is then formed as a first complex quantity with a real part A and an imaginary part B, and in a second quotient generator 4 the quotient U2/U1 is formed as a second complex quantity with a real part D and an imaginary part E.

In addition to the requirement of a zero-sequence current, as will have been clear from the above summary of the invention, a first and a second criterion containing different conditions regarding the two real and imaginary parts are required in order for a phase to be indicated as the faulted one. For the R-phase to be indicated, it is required according to the the first criterion that the condition $A < k_1 B$ and $B < 0$ are fulfilled. The determination as to whether these conditions are fulfilled is made, in an embodiment according to the FIGURE, in a comparison member R1. For the R-phase to be selected, it is also required according to the second criterion that any of the conditions $D < k_3 E$ and $E > 0$ or $D < k_4 E$ and $E < 0$ are fulfilled. The determination as to whether the first of these conditions is fulfilled is made in a comparison member R2 and the determination as to whether the second of these conditions is fulfilled is made in a comparison member R3. Via an OR-element Re, information as to whether any of the conditions in R2 or R3 is fulfilled can be passed to an AND element Ro, which is also supplied with information from the comparison member R1 as to whether this condition is fulfilled and information about the presence of a zero-sequence current. When both of the conditions of the R-phase criteria are fulfilled and when a zero-sequence current is present, a signal is delivered from the Ro-element indicating that a phase selection has been made which identifies the R-phase as faulted.

For the S-phase to be indicated, it is required according to the first criterion that the conditions $A < k_2 B$ and $B > 0$ are fulfilled. The determination as to whether the first of these conditions is fulfilled is made in a comparison member S1. For the S-phase to be selected, it is also required according to the second criterion that any of the conditions $D>k_5E$ and $E>0$ or $D>k_4E$ and $E<0$ are fulfilled. The determination as to whether the first of these conditions is fulfilled is made in a comparison member S2 and the determination as to whether the second of these conditions is fulfilled is made in a comparison member S3. Via an OR element Se, information as to whether any of the conditions in S2 or S3 is fulfilled can be passed to an AND element So which is also supplied with information from the comparison member S1 as to whether this condition is fulfilled and information about the presence of a zero-sequence current. When both of the conditions of the S-phase criteria are fulfilled and when a zero-sequence current is present, a signal is delivered from the So element indicating that a phase selection has been made which identifies the S-phase as faulted.

For the T-phase to be indicated, it is required according to the first criterion that any of the conditions $A<k_2B$ and $B>0$ is fulfilled or that the conditions $A<k_1B$ and $B<0$ are fulfilled. The determination as to whether the first of these conditions is fulfilled is made in the comparison member T1 and the determination as to whether the second of these conditions is fulfilled is made in a comparison member T2. For the T-phase to be selected, it is also required according to the second criterion that any of the conditions $D>0$ and $E>k_6E$ or $D<0$ and $E>k_7E$ are fulfilled. The determination as to whether the first of these conditions is fulfilled is made in a comparison member T3 and the determination as to whether the second of these conditions is fulfilled is made in a comparison member T4. Via an OR element TAe, information as to whether any of the conditions in T1 or T2 is fulfilled is passed to an AND element To, and via an OR element TDe information as to whether any of the conditions in T3 or T4 is fulfilled is passed to the same AND element To, which is also supplied with information about the presence of a zero-sequence current. When both of the conditions of the T-phase criteria are fulfilled and when a zero-sequence current is present, a signal is delivered from the To element indicating that a phase selection has been made which identifies the T-phase as faulted.

The value of the constants $k_1 \ldots k_7$ has been indicated under the summary of the invention.

We claim:

1. A method for phase selection in the single-pole tripping of high-impedance ground faults in direct grounded 3-phase power networks based on the use of filtered and sampled discrete time values $i_R$, $i_S$, $i_T$ and $u_R$, $u_S$, $u_T$ of respective measured phase currents and phase voltages, comprising the steps of:

continuously obtaining the symmetrical components of zero-sequence current I0 and positive-sequence and negative-sequence voltages U1, U2, respectively, which are expressed as complex numbers with one real part and one imaginary part, from said time values, measured phase currents and phase voltages;

forming a first ratio U2/I0 as a complex quantity in the form of a real part A and an imaginary part B and a second ratio U2/U1 as a complex quantity in the form of a real part D and an imaginary part E using said symmetrical components, and wherein:

(1) $U2/I0 = A + jB$ and
(2) $U2/U1 = D + jE$ and determining a faulted phase when there is a zero-sequence current according to a first criterion with conditions based on said first complex quantity (1) and a second criterion with conditions based on said second complex quantity (2); and initiating single-phase tripping when the same phase is indicated as being a faulted phase by both said first and second criterion.

2. A method for phase selection according to claim 1, further comprising the steps of:

indicating the R-phase as being a faulted phase by the conditions according to said first criterion if the following condition is obtained:

$A < k_1B$, where $B < 0$ and the S-phase is indicated as being a faulted phase if the following condition is obtained:

$A < k_2B$, where $B > 0$ and the T-phase is indicated as being a faulted phase if the following condition is obtained:

$A > k_2$, where $B > 0$ or if $A > k_1B$, where $B < 0$ and where $k_1 = -\tan 30$ degrees and $k_2 = \tan 30$ degrees; and the R-phase is indicated as being a faulted phase by the conditions according to said second criterion if the following condition is obtained:

$D < k_3E$, where $E > 0$ or if $D < k_4E$, where $E < 0$;

and the S-phase is indicated as being a faulted phase if the following condition is obtained:

$D > k_5E$, where $E > 0$ or if $D > k_4E$, where $E < 0$;

and the T-phase is indicated as being a faulted phase if the following condition is obtained:

$D > 0$, where $E > k_6D$ or if $D < 0$, where $E > k_7D$; and where $k_3 = -\tan 70$ degrees, $k_4 = -\tan 10$ degrees, $k_5 = \tan 50$ degrees, $k_6 = \tan 40$ degrees and $k_7 = -\tan 20$ degrees.

3. Apparatus for phase selection in the single-pole tripping of high-impedance ground faults in direct grounded 3-phase power networks based on the use of filtered and sampled discrete time values $i_R$, $i_S$, $i_T$ and $u_R$, $u_S$, $u_T$ of respective measured phase currents and phase voltages, comprising:

means for continuously obtaining the symmetrical components of zero-sequence current I0 and positive-sequence and negative-sequence voltages U1, U2, respectively, which are expressed as complex values with one real part and one imaginary part, from said time values, measured phase currents and phase voltages;

means for forming a first ratio U2/I0 as a complex quantity in the form of a real part A and an imaginary part B and a second ratio U2/U1 as a complex quantity in the form of a real part D and an imaginary part E using said symmetrical components, and wherein:

(1) $U2/I0 = A + jB$ and
(2) $U2/U1 = D + jE$ and means for determining a faulted phase when there is a zero-sequence current according to a first criterion with conditions based on said first complex quantity (1) and a second criterion with conditions based on said second complex quantity (2); and means for initiating single-phase tripping when the same phase is indicated as being a faulted phase by both said first and second criterion.

4. Apparatus for phase selection according to claim 3, wherein said means for determining includes first means for comparing said first ratio U2/I0 and said second ratio U2/U1 to provide an indication of the R-phase as being a faulted phase by the conditions according to said first criterion if the following condition is obtained:

$A < k_1 B$, where $B < 0$;

said means for determining further includes second means for comparing said first ratio $U2/I0$ and said second ratio $U2/U1$ to provide an indication of the S-phase as being a faulted phase by the conditions according to said first criterion if the following condition is obtained:

$A < k_2 B$, where $B > 0$ said means for determining further includes third means for comparing said first ratio $U2/I0$ and said second ratio $U2/U1$ to provide an indication of the T-phase as being a faulted phase by the conditions according to said first criterion if the following condition is obtained:

$A > k_2 B$, where $B > 0$ or if $A > k_1 B$, where $B < 0$ and where $k_1 = -\tan 30$ degrees and $k_2 = \tan 30$ degrees;

said first means for comparing further including fourth means for comparing the first ratio $U2/I0$ and the second ratio $U2/U1$ to provide an indication that the R-phase is a faulted phase by the conditions according to said second criterion if the following condition is obtained:

$D < k_3 E$, where $E > 0$ or if $D < k_4 E$, where $E < 0$;

said second means for comparing further including fifth means for comparing the first ratio $U2/I0$ and the second ratio $U2/U1$ to provide an indication that the S-phase is a faulted phase by the conditions according to said second criterion if the following condition is obtained:

$D > k_5 E$, where $E > 0$ or if $D > k_4 E$, where $E < 0$;

and said third means for comparing further including a sixth means for comparing the first ratio $U2/I0$ and the second ratio $U2/U1$ to provide an indication that the T-phase is a faulted phase by the conditions according to said second criterion if the following condition is obtained:

$D > 0$, where $E > k_6 D$ or if $D < 0$, where $E > k_7 D$; and where $k_3 = -\tan 70$ degrees, $k_4 = -\tan 10$ degrees, $k_5 = \tan 50$ degrees, $k_6 = \tan 40$ degrees and $k_7 = -\tan 20$ degrees.

5. Apparatus for phase selection according to claim 4, wherein: said means for determining further includes a first OR gate responsive to the indication of said fourth means for comparing;

said means for initiating single-phase tripping including a first AND gate responsive to: (1) said complex values, (2) the indication of said first means for comparing and (3) said first OR gate to provide a tripping signal for the R-phase of said 3-phase power network;

said means for determining further includes a second OR gate responsive to the indication of said fifth means for comparing;

said means for initiating single-phase tripping further including a second AND gate responsive to: (1) said complex values, (2) the indication of said second means for comparing and (3) said second OR gate to provide a tripping signal for the S-phase of said 3-phase power network;

said means for determining further includes a third OR gate responsive to the indication of said third means for comparing;

a fourth OR gate responsive to the indication of said sixth means for comparing; and said means for initiating single-phase tripping further including a third AND gate responsive to: (1) said complex values, (2) the indication of said third means for comparing and (3) said fourth OR gate to provide a tripping signal for the T-phase of said 3-phase power network.

* * * * *